US012300397B2

(12) United States Patent
Arafat et al.

(10) Patent No.: US 12,300,397 B2
(45) Date of Patent: May 13, 2025

(54) ENERGY PRODUCTION DEVICES AND ASSOCIATED COMPONENTS, AND RELATED HEAT TRANSFER DEVICES AND METHODS

(71) Applicants: Battelle Energy Alliance, LLC, Idaho Falls, ID (US); Qnergy Inc., Ogden, UT (US)

(72) Inventors: Yasir Arafat, Idaho Falls, ID (US); Carl E. Baily, Idaho Falls, ID (US); Douglas C. Crawford, Idaho Falls, ID (US); Blair K. Grover, Idaho Falls, ID (US); Carlo Parisi, Idaho Falls, ID (US); Allen Peterson, Eden, UT (US)

(73) Assignees: Battelle Energy Alliance, LLC, Idaho Falls, ID (US); Qnergy Inc., Ogden, UT (US)

( * ) Notice: Subject to any disclaimer, the term of this patent is extended or adjusted under 35 U.S.C. 154(b) by 35 days.

(21) Appl. No.: 17/805,250

(22) Filed: Jun. 3, 2022

(65) Prior Publication Data

US 2022/0392657 A1 Dec. 8, 2022

Related U.S. Application Data

(60) Provisional application No. 63/196,236, filed on Jun. 3, 2021.

(51) Int. Cl.
*G21D 1/02* (2006.01)
*G21C 15/02* (2006.01)
(Continued)

(52) U.S. Cl.
CPC ............... *G21D 1/02* (2013.01); *G21C 15/02* (2013.01); *G21C 15/28* (2013.01); *G21D 5/08* (2013.01); *G21D 7/04* (2013.01)

(58) Field of Classification Search
CPC .... F01K 3/181; F01K 3/26; F02C 1/05; F02C 1/10; F02C 1/08; F02G 2243/00;
(Continued)

(56) References Cited

U.S. PATENT DOCUMENTS 4,312,184 A 1/1982 Mangus
4,353,214 A * 10/1982 Gardner .................... F01K 3/00 60/659
(Continued)

FOREIGN PATENT DOCUMENTS

CN 1721682 A * 1/2006 ............. F02G 1/043
CN 1989690 A * 6/2007 ............. F02G 1/043
(Continued)

*Primary Examiner* — Wesley G Harris
(74) *Attorney, Agent, or Firm* — TraskBritt

(57) ABSTRACT

An energy production device may include a core configured to heat a heat transmission fluid, an energy harnessing device configured to convert heat into electrical energy and a heat transfer device positioned over the core configured to receive the heat transmission fluid and transfer the heat to the energy harnessing device. The energy production device may further include a vibration isolator positioned between the energy harnessing device and the heat transfer device. The vibration isolator may be configured to secure the energy harnessing device to the heat transfer device and substantially prevent the transmission of motion from the energy harnessing device to the heat transfer device.

14 Claims, 5 Drawing Sheets

(51) Int. Cl.

| | |
|---|---|
| ***G21C 15/28*** | (2006.01) |
| ***G21D 5/08*** | (2006.01) |
| ***G21D 7/04*** | (2006.01) |

(58) Field of Classification Search

CPC .. F02G 1/043; F02G 2243/02; F02G 2250/18; F02G 2250/27

See application file for complete search history.

(56) References Cited

U.S. PATENT DOCUMENTS

| | | | | | |
|---|---|---|---|---|---|
| 4,747,360 | A | * | 5/1988 | Tuncel | B63H 21/06 60/692 |
| 4,793,768 | A | * | 12/1988 | Fairchild | F16J 15/027 285/108 |
| 5,385,214 | A | * | 1/1995 | Spurgeon | B60K 3/04 60/659 |
| 10,665,355 | B2 | | 5/2020 | Kim et al. | |
| 2009/0217666 | A1 | * | 9/2009 | Farkaly | F01K 15/02 60/670 |
| 2012/0198846 | A1 | * | 8/2012 | Sieben | F22B 1/1815 60/653 |
| 2015/0096299 | A1 | * | 4/2015 | Sakadjian | F03G 6/005 60/641.8 |
| 2020/0141351 | A1 | | 5/2020 | Kim et al. | |
| 2020/0185114 | A1 | | 6/2020 | Abbott et al. | |
| 2021/0115816 | A1 | | 4/2021 | Huntington et al. | |

FOREIGN PATENT DOCUMENTS

| | | | | | |
|---|---|---|---|---|---|
| GB | 2367335 | A | * | 4/2002 | F02G 1/043 |
| JP | H05187315 | A | * | 7/1993 | F02G 1/045 |
| WO | WO-9940310 | A1 | * | 8/1999 | F02G 1/04 |
| WO | WO-2004015261 | A1 | * | 2/2004 | F02G 1/043 |
| WO | WO-2004101982 | A2 | * | 11/2004 | F02G 1/043 |
| WO | WO-2019046831 | A1 | * | 3/2019 | F02C 1/05 |

* cited by examiner

ENERGY PRODUCTION DEVICES AND ASSOCIATED COMPONENTS, AND RELATED HEAT TRANSFER DEVICES AND METHODS

CROSS-REFERENCE TO RELATED APPLICATION

This application claims the benefit under 35 U.S.C. § 119(e) of U.S. Provisional Patent Application Ser. No. 63/196,236, filed Jun. 3, 2021, the disclosure of which is hereby incorporated herein in its entirety by this reference.

SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Embodiments of the present disclosure generally relate to energy production devices. In particular, embodiments of the present disclosure relate to energy production devices and associated components, systems, and methods.

BACKGROUND

Some energy production devices harness heat by capturing, storing, or converting the heat to another form of energy, such as electrical energy. The heat may be produced through burning processes, such as coal fire power plants, or by heat generated by a reactor, such as a nuclear reactor. Nuclear reactors contain and control nuclear chain reactions that produce heat through a physical process called fission, where a particle (e.g., a neutron) is fired at an atom, which then splits into two smaller atoms and some additional neutrons. Some of the released neutrons then collide with other atoms, causing them to also fission and release more neutrons. A nuclear reactor achieves criticality (commonly referred to in the art as going critical) when each fission event releases a sufficient number of neutrons to sustain an ongoing series of reactions. Fission also releases a large amount of heat. The heat is removed from the reactor by a circulating fluid. This heat can then be used to produce electricity or can be harnessed and stored for uses, such as heating a facility or heating water.

BRIEF SUMMARY

Embodiments of the disclosure may include an energy production device. The energy production device may include a core configured to heat a heat transmission fluid. The energy production device may further include a heat transfer device positioned over the core and configured to receive the heat transmission fluid and to transfer the heat to an energy harnessing device configured to convert heat into electrical energy. The energy production device may also include a vibration isolator positioned between the energy harnessing device and the heat transfer device, the vibration isolator configured to secure the energy harnessing device to the heat transfer device and substantially prevent the transmission of motion from the energy harnessing device to the heat transfer device.

Another embodiment of the disclosure may include a heat transfer device. The heat transfer device may include a stationary portion coupled to a first component. The heat transfer device may further include a moving portion coupled to a second component. The heat transfer device may also include a vibration isolator positioned between the moving portion and the stationary portion. The heat transfer device may further include a heat transfer fluid loop configured to contain a liquid heat transfer medium to flow through the heat transfer fluid loop and transfer heat from the second component to the first component.

Another embodiment of the disclosure may include a method of operating an energy production device. The method may include heating a heat transmission fluid in a core. The method may further include flowing the heat transmission fluid out of the core and through a heat transfer device. The method may also include heating a secondary heat transfer medium contained in the heat transfer device with the heat transmission fluid. The method may further include converting heat from the secondary heat transfer medium to mechanical motion through an energy harvesting device mounted to a mounting portion of the heat transfer device. The method may also include isolating residual motion of the energy harvesting device from a stationary portion of the heat transfer device through a vibration isolator positioned between the mounting portion of the heat transfer device and the stationary portion of the heat transfer device.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular energy production device or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met. In another example, a parameter that is substantially prevented may be at least about 90% prevented, at least about 95% prevented, at least about 99% prevented or even at least about 100% prevented.

As used herein, relational terms, such as "first," "second," "top," "bottom," "upper," "lower," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

Figure 1:
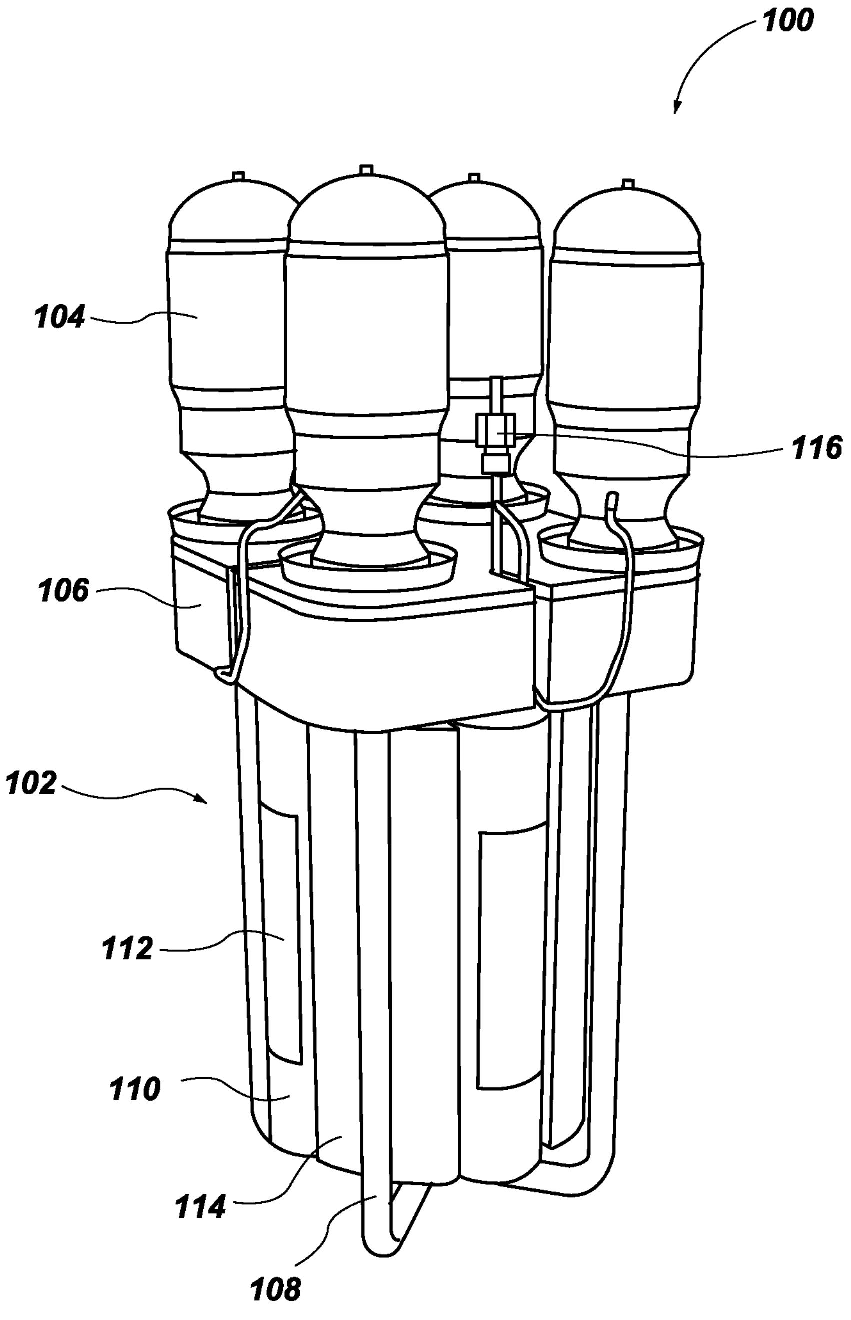
FIG. 1 illustrates a perspective view of an energy production device in accordance with embodiments of the present disclosure.

FIG. 1 illustrates an energy production device 100. The energy production device 100 may include a core 102 and one or more energy harnessing devices 104 separated by a heat transfer device 106. The energy production device 100 may be arranged in a vertical orientation, such that the core 102 is in a lower position with the heat transfer device 106 and the energy harnessing devices 104 positioned over the core 102. The heat transfer device 106 may thermally couple the energy production device 100 to the energy harnessing devices 104. The energy production device 100 may include downtubes 108 configured to return fluid from the heat transfer device 106 to a bottom portion of the core 102. The core 102 described below is a nuclear fission reactor, however, it is noted that embodiments of this disclosure may encompass other types of energy production devices configured to convert heat into energy, such as nuclear isotope reactors, nuclear isomer reactors, solar thermal generators, fluidized bed heat transfer systems, packed bed heat transfer systems, gaseous heat transfer systems, combustion systems (e.g., coal fire, natural gas, etc.), among others.

The core 102 may include one or more reaction control devices 110, such as control drums or control rods. The reaction control devices 110 may include a neutron-absorbing material 112 on at least a portion of the reaction control devices 110. As described in further detail below, the neutron-absorbing material 112 may be configured to absorb neutrons from a nuclear reaction occurring within the core 102 to control, reduce, or even stop the chain reaction of fission occurring within the core 102. The reaction control devices 110 may be controlled through control module 116. For example, the control module 116 may cause control drums (e.g., the reaction control devices 110) to rotate or may insert or withdraw control rods. In some embodiments, the control module 116 may control the reaction control devices 110 based on signals received from a computer or an operator. In some embodiments, the control module 116 may control the reaction based on signals received from sensors within the energy production device 100. In some embodiments, the control module 116 may control the reaction control devices 110 based on a loss of signal or power.

The core 102 may also include core shielding 114 configured to reflect loose neutrons back into the core 102 to continue in the fission chain reaction. The core shielding 114 may also serve to reduce (e.g., eliminate) the amount of radiation leaving the core 102. Reducing the amount of radiation leaving the core 102 may enable the energy production device 100 to be installed in closer proximity to people, which may reduce the costs of installing and maintaining the energy production device 100. In contrast, conventional energy production devices may be installed in remote locations, away from people, due to safety concerns.

The core 102 may be configured to heat a heat transmission fluid, such as a liquid metal, within the core 102 through the fission chain reaction being controlled within the core 102. The liquid metal may be a metal that is configured to be in a liquid phase at temperatures at or near room temperature, such as sodium potassium eutectic (NaK), Bismuth-Lead-Tin (Bi—Pb—Sn) alloys (e.g., Rose's metal, CERROSAFE, WOOD'S METAL, FIELD'S METAL, CERROLOW (e.g., CERROLOW 136, CERROLOW 117), Bi—Pb—Sn—Cd—In—Ti, GALINSTAN®). As used herein room temperature is a temperature commonly inhabited by people, such as a temperature between about 15° C. (about 59° F.) and about 27° C. (about 80.6° F.), such as from about 20° C. (about 68° F.) to about 25° C. (about 77° F.).

The heated heat transmission fluid may flow into the heat transfer device 106 from the core 102. In some embodiments, the energy production device 100 may be configured to induce the heat transmission fluid to flow through natural convection generated by heating the heat transmission fluid. For example, as the heat transmission fluid is heated, the heated fluid may rise above the cooler fluid creating an upward current. The upward current may cause the heated heat transmission fluid to rise into the heat transfer device 106, where the heat in the heat transmission fluid may be transferred to another fluid through the heat transfer device 106. Transferring the heat from the heated heat transmission fluid may cool the heat transmission fluid. The cooled heat transmission fluid may then travel through downtubes 108 returning to a bottom portion of the core 102 where the heat transmission fluid may again be heated and flow upwards through the core 102. In some embodiments, the natural convection induced current may eliminate the need for a separate pump to move the heat transmission fluid through the core 102. Eliminating a separate pump may reduce the size requirements for the energy production device 100. In some embodiments, eliminating a separate pump may reduce the potential points of failure in the energy production device 100, such as by eliminating the potential for a failed pump as well as the elimination of additional joints in the fluid flow path where leaks may occur. In environments where there is little or no gravity, natural convection may not induce sufficient flow. Therefore, in zero gravity environments, such as space, a separate pump may be added to generate flow in the heat transmission fluid.

The heat transfer device 106 may be configured to transfer heat from the heat transmission fluid to a secondary liquid heat transfer medium, such as another liquid or a gas. The heat in the secondary liquid heat transfer medium may be harnessed by the energy harnessing devices 104. For example, the energy harnessing devices 104 may be a closed-cycle power conversion device, such as Stirling engines, Brayton engines, or Rankine engines, configured to generate electricity from pressure changes caused by heating a working fluid, such as helium (He), hydrogen ($H_2$), nitrogen ($N_2$), methane ($CH_4$), ammonia ($NH_3$), Carbon dioxide ($CO_2$), etc. For example, a Stirling engine may convert pressure changes caused by cyclically heating and cooling the working fluid into mechanical work, such as linear motion. However, other energy harnessing devices 104 may be used. The mechanical work may then be converted into electricity through processes such as moving magnets over wire coils, etc. The secondary liquid heat transfer medium may transmit heat to the working fluid through an interface between the heat transfer device 106 and the Stirling engine (e.g., the energy harnessing device 104).

Closed-cycle power conversion devices (e.g., Stirling engines, Brayton engines, Rankine engines) are known for their simplicity and reliability due to the relatively small number of moving parts. Typically, the internal moving parts include a piston and displacer. Due to the relatively small number of moving parts, such devices do not conventionally employ any devices for isolating, dampening, or cancelling vibration from component motion. Consequently, some Closed-cycle power conversion devices may move and vibrate during operation and may undesirably transmit force to the surfaces and surroundings on which they are mounted. In some embodiments, such as the energy production device 100 illustrated in FIG. 1, the energy harnessing device is mounted to the heat transfer device 106, such that heat can be exchanged at the interface thereof in order to operate the energy harnessing device. The vibrations from the Closed-cycle power conversion devices may cause failures of welds or brazes where the vibration stresses to the stationary heat transfer device 106 are concentrated in a conventional device.

The heat transfer device 106 may be configured to absorb vibrations from the energy harnessing device 104 (e.g., closed-cycle power conversion device) to substantially prevent damage from the vibration stresses. For example, as described in further detail below with respect to FIG. 2, the heat transfer device 106 may be formed from at least two portions configured to move relative to one another. Thus, a first portion of the heat transfer device 106 coupled to the energy harnessing devices 104, such as a top plate of the heat transfer device 106, may receive any vibrations and/or movement from the energy harnessing devices 104. The first portion of the heat transfer device 106 may move relative to a second portion of the heat transfer device 106. As described in further detail below, the heat transfer device 106 may also include components configured to absorb and/or dampen the movement of the first portion of the heat transfer device 106.

Figure 2:
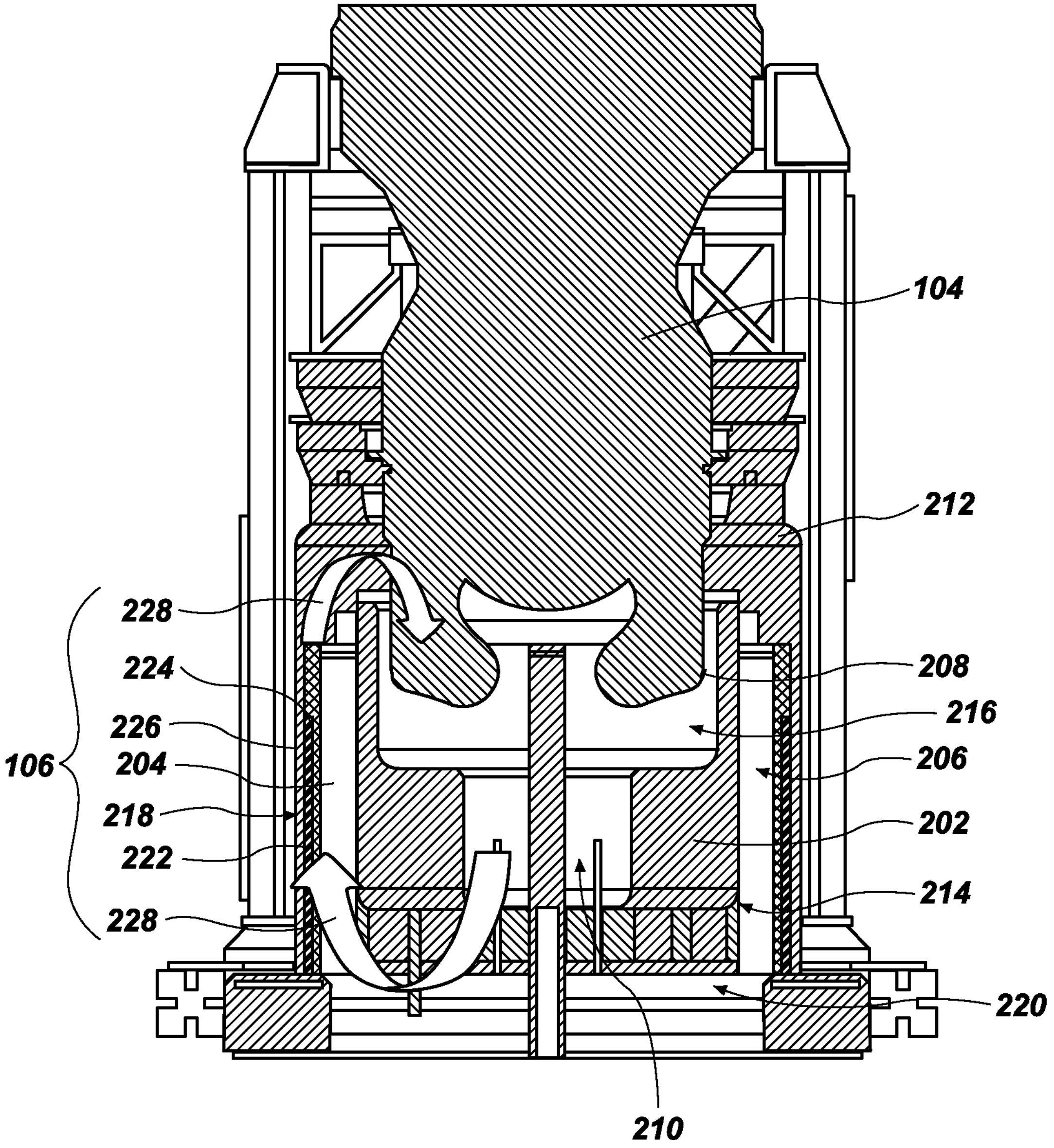
FIG. 2 illustrates a cross-sectional view of a heat transfer device and energy harnessing device interface of the energy production device of FIG. 1.

FIG. 2 shows the heat transfer device 106 heating an absorber heat exchanger 202 of an energy harnessing device 104, which may be an engine, such as a Stirling engine, Brayton engine, Rankine engine. The heat transmission fluid may enter the heat transfer device 106 through a flow inlet (not shown) located in an upper region of the heat transfer device 106. The heat transmission fluid may flow from the flow inlet through the heat transfer device 106 and into one of the downtubes 108 (FIG. 1) to return to the core 102 (FIG. 1). The heat transfer device 106 may include an upper plenum 216, a lower plenum 220, secondary risers 206, and a secondary downtube 210, which in combination form a fluid loop. A secondary liquid heat transfer medium 204 may be contained within the fluid loop including the upper plenum 216, lower plenum 220, secondary riser 206, and secondary downtube 210. The heat transmission fluid may enter adjacent to the upper plenum 216 creating the hottest region of a primary side of the heat transfer device 106. The heat transmission fluid may then travel downward through the heat transfer device 106 around the secondary risers 206 transferring heat from the heat transmission fluid to a secondary liquid heat transfer medium 204 within the heat transfer device 106 before exiting the heat transfer device 106 through one of the downtubes 108 adjacent to the lower plenum 220, which may be the coolest region of the primary side of the heat transfer device 106.

The secondary liquid heat transfer medium 204 may flow through the secondary risers 206 absorbing heat from the heat transmission fluid in the heat transfer device 106. As the secondary liquid heat transfer medium 204 absorbs the heat, the secondary liquid heat transfer medium 204 may rise through the heat transfer device 106 under natural convection similar to the heat transmission fluid in the core 102 (FIG. 1). The temperature of the heat transmission fluid may increase as the secondary liquid heat transfer medium 204 rises higher in the secondary risers 206. Thus, as the secondary liquid heat transfer medium 204 reaches a top portion of the heat transfer device 106 proximate the energy harnessing device 104, the secondary liquid heat transfer medium 204 may be at its highest temperature. The secondary liquid heat transfer medium 204 may circulate through natural convection as indicated by arrows 228 similar to the heat transmission fluid.

The secondary liquid heat transfer medium 204 may be isolated from both the heat transmission fluid and the working fluid of the energy harnessing device 104. The heat from the secondary liquid heat transfer medium 204 may be absorbed by heat transfer surfaces 208 of the energy harnessing device 104. The heat transfer surfaces 208 may be disposed in the upper plenum 216, where the heat transfer surfaces 208 may interface with the secondary liquid heat transfer medium 204. The heat transfer surfaces 208 may include the working fluid of the energy harnessing device 104 therein. As the working fluid absorbs the heat from the secondary liquid heat transfer medium 204 through the heat transfer surfaces 208, the working fluid pressure may increase causing the working fluid to expand generating mechanical work in the energy harnessing device 104. The expansion of the working fluid may reduce the temperature of the working fluid. In some embodiments, excess heat in the working fluid that was not released from the expansion of the working fluid may be removed through an external cooling system.

The secondary liquid heat transfer medium 204 may facilitate large differences in size between the heat transfer device 106 and the core 102. For example, for cores with lower operating temperatures, such as a waste burning system, the heat transfer device 106 may have a smaller heat transfer area (e.g., a smaller absorber heat exchanger 202) relative to the size of the interface between the core 102 and the heat transfer device 106. In other embodiments, such as relatively small devices that generate large amounts of heat (e.g., circuits or instruments having a high heat flux), the heat transfer area may be substantially larger than the interface between the core 102 and the heat transfer device, such that the heat transfer device 106 may act as a thermal spreader.

The secondary liquid heat transfer medium 204 may have a melting point chosen to be in a range suitable for maintaining an acceptable temperature for the components of energy harnessing device 104, which may be immersed in the secondary liquid heat transfer medium 204 during operation. The desired melting point may be over about 100° C. (over about 212° F.), such as in the range from about 100° C. (about 212° F.) to about 700° C. (about 1292° F.), or from about 200° C. (about 392° F.) to about 600° C. (about 1112° F.). For example, a Stirling engine operating as the energy harnessing device 104, may be configured to begin producing electrical power at temperatures above about 250° C. (about 482° F.) at the interface between the secondary liquid heat transfer medium 204 and the heat transfer surfaces 208. The Stirling engine may be configured to generate between about 5 kilowatts (kW) and about 10 kW of power at temperatures above about 500° C. (about 932° F.) at the interface between the secondary liquid heat transfer medium 204 and the heat transfer surfaces 208. The secondary liquid heat transfer medium 204 is preferably benign (e.g., non-reactive) with surrounding structure and has a sufficiently low melting point and a sufficiently high boiling point to be practical for use as a liquid thermosiphon.

The secondary liquid heat transfer medium 204 may be a solid when not in use (e.g., at room temperature) but a freely circulating liquid at elevated temperatures (e.g., above about 100° C. (212° F.), above about 250° C. (482° F.), etc.) when heat transfer is occurring. The secondary liquid heat transfer medium 204 may have a boiling point above about 1000° C. (1832° F.). The secondary liquid heat transfer medium 204 may or may not be separated from ambient air in the heat transfer device 106. For example, an inert cover gas, such as argon, may be included in the upper plenum 216 over the secondary liquid heat transfer medium 204. The cover gas may keep the secondary liquid heat transfer medium 204 separated from air. In other embodiments, a vacuum may be maintained in the upper plenum 216 to substantially remove any gases released over the secondary liquid heat transfer medium 204. The gases removed by the vacuum may then be treated and/or cleaned before being released to the ambient air.

Non-limiting examples of the secondary liquid heat transfer medium 204 may include lead-bismuth eutectic alloy, lead, Babbitt metal, and bismuth. Other examples include thermal salts or liquids, such as silicone (e.g., polysiloxane) or organic materials (e.g., glycols, or mineral oils).

As described above, the heat transfer device 106 may be formed from multiple components configured to absorb and/or isolate vibrations of the energy harnessing devices 104. The heat transfer device 106 may include a mounting portion 212 and a stationary portion 214. The mounting portion 212 may be configured to secure the energy harnessing device 104 to the heat transfer device 106. The stationary portion 214 may be configured to secure the heat transfer device 106 to the energy production device 100. The mounting portion 212 may be coupled to the stationary portion 214 through a vibration isolator 218.

In some embodiments, the mounting portion 212 and the stationary portion 214 may form nested containers. The mounting portion 212 and the stationary portion 214 may have similar shapes with one of the mounting portion 212 and the stationary portion 214 having a larger major dimension (e.g., diameter, width, apothem, etc.) than the other of the mounting portion 212 and the stationary portion 214. For example, the mounting portion 212 and the stationary portion 214 may each be cylindrical in shape. The mounting portion 212 may have a smaller diameter than the stationary portion 214, such that the stationary portion 214 may substantially surround the mounting portion 212. The vibration isolator 218 may be positioned between an outer surface of the mounting portion 212 and an inner surface of the stationary portion 214.

The vibration isolator 218 may include a bellows 222 made of a material that can withstand temperatures at or above the temperature of the molten secondary liquid heat transfer medium 204 during use of energy production device 100. For example, the bellows 222 may be formed from, stainless steel alloys, titanium alloys among others. The bellows 222 may be positioned proximate the inner volume(s) of the heat transfer device 106 in which the heat transmission fluid and the secondary liquid heat transfer medium 204 are contained. The vibration isolator 218 may further include an insulating layer 224 positioned between the bellows 222 and an elastomeric material element 226. The insulating layer 224 may be configured to inhibit the transfer of heat through the vibration isolator 218. The insulating layer 224 may be formed from a high temperature insulating material. For example, the insulating layer 224 may be formed from a rigid insulating material, such as a ceramic material, which may provide additional structural rigidity to the vibration isolator 218. In another example, the insulating layer 224 may be formed from a flexible insulating material, such as a high temperature fiber insulation (e.g., fiberglass, ceramic fiber, polycrystalline fiber, etc.), which may be applied over the bellows 222 and may change shape under load absorbing at least a portion of the vibration and/or movement of the mounting portion 212 relative to the stationary portion 214. The elastomeric material element 226 may provide enhanced vibrational isolation capability. The elastomeric material element 226 may be formed from a high temperature elastomeric material. Elastomeric materials that operate at high temperatures include, without limitation, silicone, FKM (fluorocarbon-based fluoroelastomer VITON), CSM (chlorosulfonated polyethylene), hydrogenated acrylonitrile-butadiene rubber (HNBR), and EPDM (ethylene-propylene-diene monomer). The insulating layer 224 may facilitate using elastomeric materials as the elastomeric material element 226 that operate at a temperature less than the temperature of the molten secondary liquid heat transfer medium 204.

In some embodiments, the vibration isolator 218 may further include an air gap. For example, the elastomeric material element 226 may be replaced with an air gap defined between the vibration isolator 218 and the stationary portion 214. For example, the air gap may be defined between the insulating layer 224 of the vibration isolator 218 and a wall of the upper plenum 216 of the stationary portion 214. The air gap may facilitate higher operating temperatures than an elastomeric material. As described above, a vacuum may be generated to substantially remove any gases formed over the secondary liquid heat transfer medium 204, such that there may be a negative pressure within the air gap.

The interface between the mounting portion 212 and the stationary portion 214 created by the vibration isolator 218 may facilitate the removal of the mounting portion 212 and the energy harnessing device 104 coupled thereto. For example, the vibration isolator 218 may form a floating interface, substantially free of mechanical fasteners. The mounting portion 212 may be maintained in position relative to the stationary portion 214 through interference between the elastomeric material element 226 and a wall of the upper plenum 216 of the stationary portion 214. In other embodiments, the mounting portion 212 may be maintained in position by a vacuum generated in the upper plenum 216. Thus, the mounting portion 212 may be removed from the stationary portion 214 without substantial amounts of disassembly. As described above, the moving parts in the system may be substantially contained in the energy harnessing device 104. Removing the mounting portion 212 and the energy harnessing device 104 may facilitate the replacement of worn or damaged components.

Figure 3A:
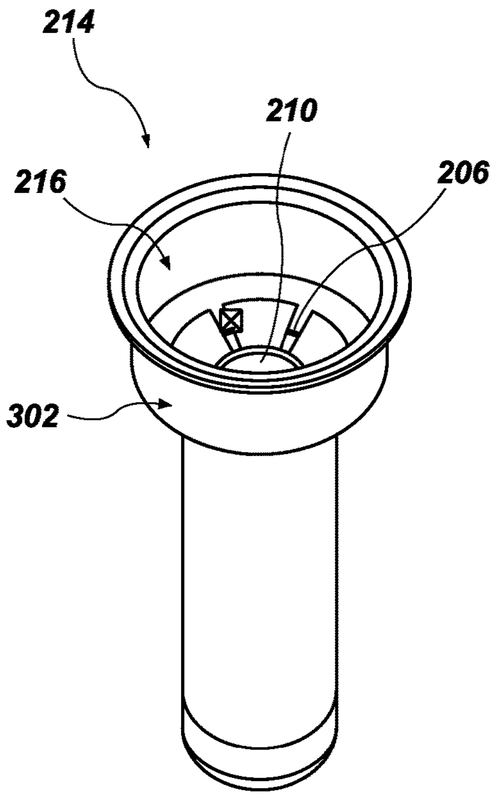
FIG. 3A illustrates a perspective view of a portion of the heat transfer device of FIG. 2.
Figure 3B:
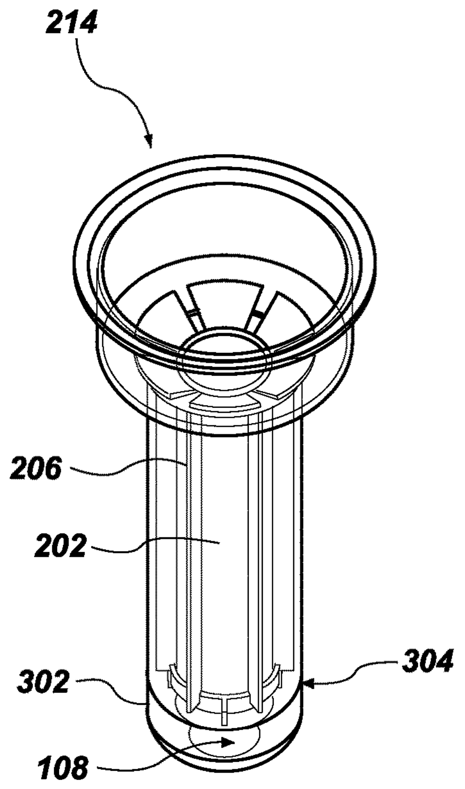
FIG. 3B illustrates a perspective view of the portion of the heat transfer device of FIG. 3A with a portion of an outer shell removed.
Figure 3C:
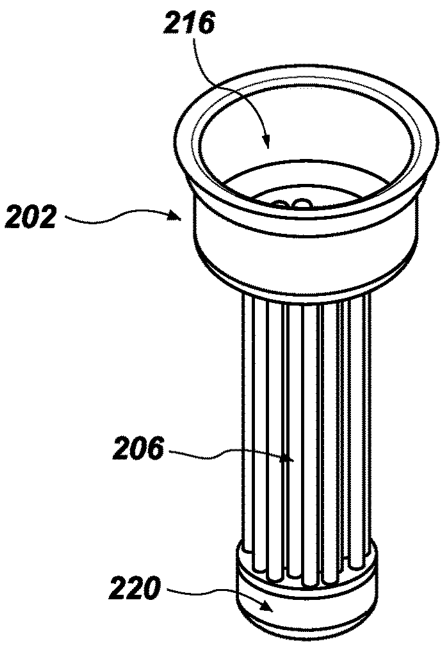
FIG. 3C illustrates a perspective view of the portion of the heat transfer device of FIGS. 2-3B with the outer shell removed.

In some embodiments, the heat transfer device 106 and energy harnessing device 104 may alternatively be used to cool a device. For example, a heat transfer device 106 may be coupled between a Stirling Engine and a heat source to remove heat from the heat source, such as for a heat pump, cooling system, cryogenic cooling system, etc. Different heat transmission fluids and secondary liquid heat transfer media 204 may facilitate different operating temperatures for different applications. The heat transmission fluids and secondary liquid heat transfer media may be selected to be in a liquid state (e.g., not frozen or gaseous) within the operating temperature range of the application. For example, low temperature heat transmission fluids and secondary liquid heat transfer media may include water, glycol, alcohol, oils, etc. FIGS. 3A-3C illustrate different views of an embodiment of the stationary portion 214 of the heat transfer device 106. FIG. 3A illustrates a perspective view of the stationary portion 214 of the heat transfer device 106. FIG. 3B illustrates a perspective view of the stationary portion 214 of the heat transfer device 106 with a portion of one or more components removed to view internal components of the stationary portion 214. FIG. 3C illustrates a perspective view of the absorber heat exchanger 202 of the stationary portion 214 of the heat transfer device 106.

The stationary portion 214 may be substantially surrounded by an outer shell 302. The outer shell 302 may define an interior volume 304, as illustrated in FIG. 3B. The absorber heat exchanger 202 may be disposed in the interior volume 304. The outer shell 302 may be coupled to the energy production device 100 (FIG. 1), such that the heat transmission fluid from the core 102 (FIG. 1) may pass through the interior volume 304 of the stationary portion 214 of the heat transfer device 106. As described above, the absorber heat exchanger 202 may include secondary risers 206. The heat transmission fluid passing through the interior volume 304 may flow around the secondary risers 206 transferring heat to the secondary liquid heat transfer medium 204 within the secondary risers 206. Thus, the heat transmission fluid may be in direct contact with an interior surface of the outer shell 302 and an outer surface of the secondary risers 206.

As described above, the heat transmission fluid may enter the heat transfer device 106 proximate an upper portion of the heat transfer device 106 and exit the heat transfer device 106 through the downtube 108 positioned in a lower portion of the heat transfer device 106, such that the temperature of the heat transmission fluid is higher in the upper portion of the heat transfer device 106 relative to the lower portion of the heat transfer device 106. As described above, this temperature gradient may facilitate the transfer of heat into the secondary liquid heat transfer medium 204 in a manner that may induce the secondary liquid heat transfer medium 204 to flow upwards in the secondary risers 206 through natural convection. The secondary liquid heat transfer medium 204 may flow out of the secondary risers 206 into the upper plenum 216 of the stationary portion 214. The upper plenum 216 may be configured to receive the heat transfer surfaces 208 of the energy harnessing device 104 (FIG. 2). The secondary liquid heat transfer medium 204 may pass over the heat transfer surfaces 208 of the energy harnessing device 104. After the secondary liquid heat transfer medium 204 passes over the heat transfer surfaces 208 and transfers heat to the working fluid of the energy harnessing device 104, the cooled secondary liquid heat transfer medium 204 may pass through the secondary downtube 210 to the lower plenum 220 illustrated in FIG. 3C, before flowing back into the secondary risers 206 and being heated by the heat transmission fluid again. Thus, the secondary liquid heat transfer medium 204 may be in direct contact with interior surfaces of the secondary risers 206, an interior surface of the secondary downtube, interior surfaces of the lower plenum 220, interior surfaces of the upper plenum 216 and the heat transfer surfaces 208. The secondary liquid heat transfer medium 204 may also be in direct contact with interior surfaces of the bellows 222 and the mounting portion 212, as described in further detail below.

As illustrated in FIGS. 3A and 3B, the secondary downtube 210 may be positioned in a central portion of the stationary portion 214 and the secondary risers 206 may be arranged about the secondary downtube 210, such that the secondary downtube 210 is separated from the interior volume 304 by the secondary risers 206.

The secondary risers 206 may be formed from a material having high thermal conductivity and configured to withstand high temperatures, such as temperatures of at least the operating temperature of the heat transmission fluid (e.g., above about 100° C., above about 250° C., above about 500° C., etc.). For example, the secondary risers 206 may be formed from, stainless steel alloys or titanium alloys, among others. The outer shell 302 may be formed from a material configured to withstand high temperatures as well. In some embodiments, the outer shell 302 may be formed from a thermally insulative material (e.g., a material having a low thermal conductivity), such as a ceramic material. In other embodiments, the outer shell 302 may be formed from a thermally conductive material (e.g., a material having a high thermal conductivity), such as stainless steel alloys or titanium alloys. In some embodiments, the outer shell 302 may include additional layers, such as thermal insulation layers, insulating wraps, radiation shielding layers, radiation reflecting layers, etc.

The energy harnessing device 104 may be secured to the mounting portion 212 of the heat transfer device 106. The mounting portion 212 may be configured to be inserted into the upper plenum 216 of stationary portion 214 of the heat transfer device 106, such that the heat transfer surfaces 208 of the energy harnessing device 104 may be positioned in the upper plenum 216.

Figure 4:
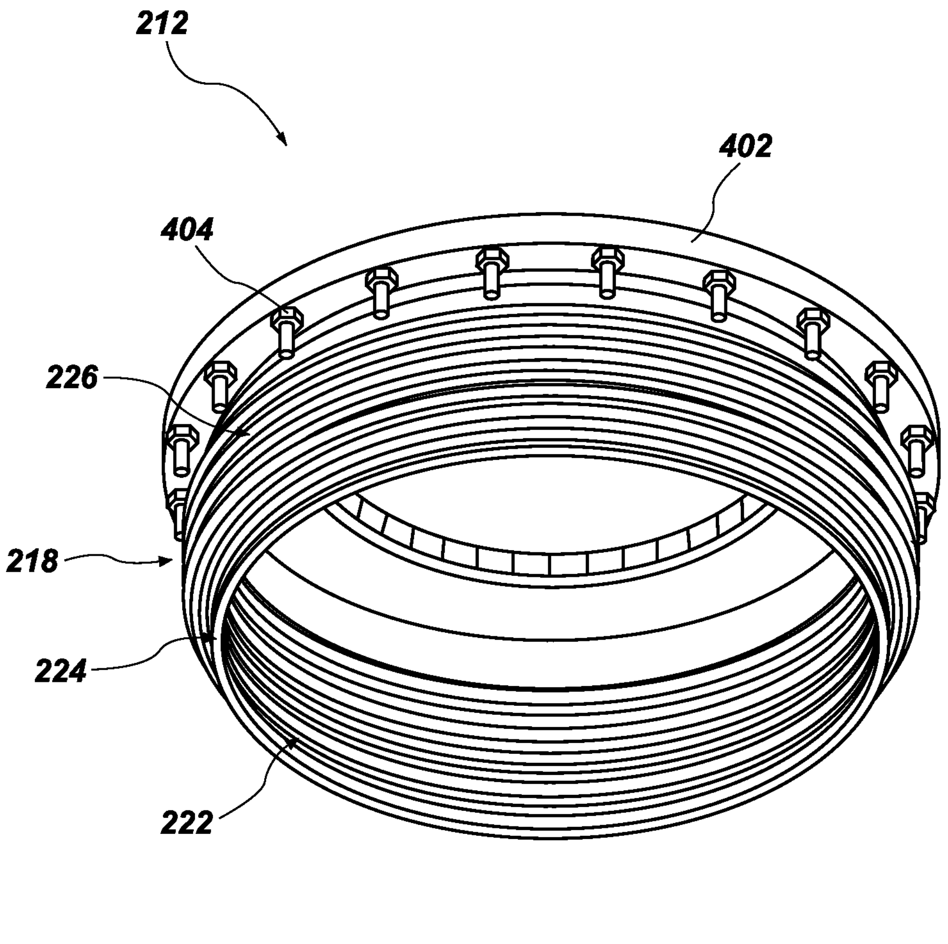
FIG. 4 illustrates a perspective of a component of the heat transfer device of FIG. 2.

FIG. 4 illustrates a perspective view of the mounting portion 212 of the heat transfer device 106. The mounting portion 212 may include a mounting plate 402 configured to be secured to the energy harnessing device 104. For example, the mounting plate 402 may include a coupling mechanism 404, such as hardware (e.g., studs, pins, etc.) or hardware receiving components (e.g., mounting holes, threaded holes, etc.), interlocking geometry, etc.

The vibration isolator 218 may extend from the mounting plate 402. The vibration isolator 218 may be configured to be inserted into the upper plenum 216 of the stationary portion 214 of the heat transfer device 106. As described above, the vibration isolator 218 may include multiple layers of materials. The vibration isolator 218 may include the bellows 222 formed from a temperature resistant material configured to withstand temperatures including the operating temperature of the secondary liquid heat transfer medium 204. The bellows 222 may form an inner surface of the vibration isolator 218 of the mounting portion 212, such that when inserted into the upper plenum 216, the bellows 222 may interface with the secondary liquid heat transfer medium 204 in the upper plenum 216.

The next layer of the vibration isolator 218 may be the insulating layer 224. The insulating layer 224 may be positioned on an exterior surface of the bellows 222. The insulating layer 224 may be configured to substantially prevent heat from the secondary liquid heat transfer medium 204 from passing through the vibration isolator 218. Substantially preventing heat from transferring through the vibration isolator 218 may increase an efficiency of the heat transfer device 106, such as by increasing the amount of heat being transferred from the secondary liquid heat transfer medium 204 to the heat transfer surfaces 208. Furthermore, reducing the heat transferring through the insulating layer 224 may facilitate the use of the elastomeric material element 226 between the vibration isolator 218 and a wall of the upper plenum 216. The elastomeric material element 226 between the vibration isolator 218 and the wall of the upper plenum 216 may provide a flexible seal between the vibration isolator 218 and the wall of the upper plenum 216. The flexible seal may substantially prevent outside air from entering the upper plenum 216 and may substantially prevent the secondary liquid heat transfer medium 204 and/or the inert cover gas, described above, from exiting the upper plenum 216. The flexible seal may also substantially absorb movement of the energy harnessing device 104, while substantially preventing the movement from being transferred to the stationary portion 214 of the heat transfer device 106.

As illustrated in FIG. 4, the elastomeric material element 226 may include a group of elevated elastomeric elements, such as ribs. The elevated elastomeric elements may form a group of parallel rings, as illustrated in FIG. 4, surrounding the insulating layer 224. In other embodiments, the elevated elastomeric elements may form a series of vertical ribs (not shown) spaced about an outer surface of the insulating layer 224. In another embodiment, the elastomeric material element 226 may be a elastomeric layer having a substantially uniform thickness across the entire outer surface of the insulating layer 224.

As described above, some embodiments may not include the elastomeric material element 226. Rather an air gap may be defined between the insulating layer 224 of the vibration isolator 218 and the wall of the upper plenum 216. The use of the air gap rather than the elastomeric material element 226, may result in an un-sealed upper plenum 216. Because the upper plenum 216 is un-sealed in such an embodiment, a negative pressure may be applied through the air gap, such that the upper plenum 216 is under a negative pressure (e.g., vacuum). The negative pressure may substantially remove any gases that may form in the upper plenum 216 over the secondary liquid heat transfer medium 204, which may substantially prevent any gases released from the secondary liquid heat transfer medium 204 from entering the atmosphere and/or reacting with air before being treated and/or neutralized. As described above, the air gap may facilitate higher operating temperatures, which may increase an efficiency of the associated energy production device 100. The uniform negative pressure in the air gap may absorb movement of the vibration isolator 218 and substantially prevent the movement from being transferred to the stationary portion 214 of the heat transfer device 106. As described above, the insulating layer 224 may be formed from a flexible insulating material, which may also absorb movement of the vibration isolator 218.

Figure 5:
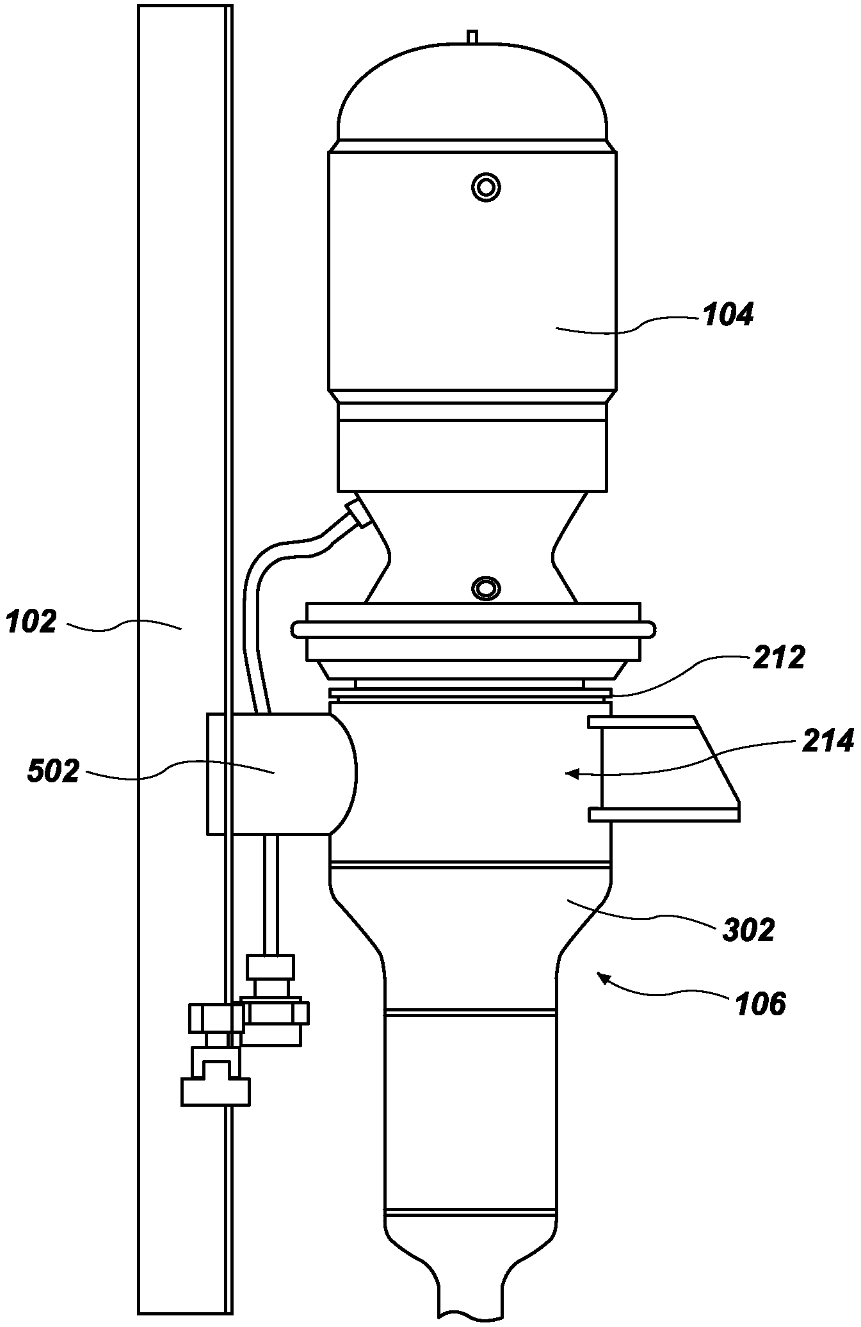
FIG. 5 illustrates a portion of an energy production device including the heat transfer device and energy harnessing device of FIG. 2.

FIG. 5 illustrates the assembly of the heat transfer device 106 coupled to a core 102 with covers removed to show internal components. The stationary portion 214 of the heat transfer device 106 may be coupled to the core 102 through an inlet 502. The inlet 502 may supply the heat transmission fluid from the core 102 through the outer shell 302 of the stationary portion 214 into the interior volume 304 (FIG. 3B). The inlet 502 may be coupled to the outer shell 302 through a process, such as welding, brazing, etc., configured to form a substantially rigid sealed joint.

The mounting portion 212 along with the vibration isolator 218 (FIG. 4) may be coupled to an upper portion of the stationary portion 214 by being inserted into the upper plenum 216. As described above, the vibration isolator 218 may be configured to substantially prevent vibrations and other movement of the energy harnessing device 104 from being transmitted to the stationary portion 214 of the heat transfer device 106. Thus, the vibration isolator 218 may reduce stresses to the rigid sealed joint between the inlet 502 and the outer shell 302 by substantially reducing the movement and/or vibrations going through the stationary portion 214 of the heat transfer device 106.

The energy production device 100 according to embodiments of the disclosure may substantially absorb vibrations from heat conversion engines, which may substantially prevent movement of the heat conversion engines from being transferred to the heat transfer device and/or core of the associated energy production device. Preventing the transfer of vibrations and movement may substantially prevent damage from occurring to components of the energy production device and/or damage to joints between components. Preventing damage to the components and/or joints may increase a reliability of the associated energy production device and may increase a service life of the associated energy production device. Since the energy harnessing devices 104 may be a Stirling engine, which are commercially available, the energy production device 100 according to embodiments of the disclosure may be easily designed without requiring modifications to the energy harnessing devices 104. The size, type, and design of the Stirling engine may be selected depending on the intended use of the energy production device 100.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. An energy production device comprising:

a core configured to heat a heat transmission fluid;

a heat transfer device comprising an upper plenum and a secondary heat transfer medium, the heat transfer device positioned over the core and configured to receive the heat transmission fluid and to transfer the heat to an energy harnessing device through the secondary heat transfer medium, the energy harnessing device configured to convert heat into electrical energy; and a vibration isolator positioned between a wall of the upper plenum and the secondary heat transfer medium in the upper plenum, the vibration isolator configured to secure the energy harnessing device to the heat transfer device and substantially prevent transmission of motion from the energy harnessing device to the heat transfer device.

2. The energy production device of claim 1, wherein the vibration isolator comprises multiple layers including a bellows and an insulator.

3. The energy production device of claim 2, the vibration isolator further comprising an elastomeric material interface.

4. The energy production device of claim 3, wherein the insulator is positioned between the bellows and the elastomeric material interface.

5. The energy production device of claim 1, wherein the heat transfer device further comprises one or more secondary risers configured to contain the secondary heat transfer medium, the one or more secondary risers extending between a lower plenum and the upper plenum.

6. The energy production device of claim 5, wherein the one or more secondary risers are configured to isolate the secondary heat transfer medium from the heat transmission fluid.

7. The energy production device of claim 5, wherein the upper plenum is configured to receive an inert cover gas over the secondary heat transfer medium.

8. The energy production device of claim 1, further comprising an air gap between the vibration isolator and the heat transfer device.

9. A heat transfer device comprising:

a stationary portion coupled to a first component;

a moving portion coupled to a second component;

a vibration isolator positioned between the moving portion and the stationary portion; and a heat transfer fluid loop configured to contain a liquid heat transfer medium to flow through the heat transfer fluid loop and transfer heat from the second component to the first component, wherein the vibration isolator comprises a bellows, an elastomeric material, and an insulator, the bellows comprising a material configured to withstand temperatures at or above a molten temperature of the liquid heat transfer medium and the insulator positioned between the bellows and the elastomeric material and configured to substantially prevent heat from the liquid heat transfer medium from passing from the bellows to the elastomeric material.

10. The heat transfer device of claim 9, wherein the liquid heat transfer medium is selected from the group consisting of sodium potassium eutectic (NaK), Bismuth—Lead—Tin (Bi—Pb—Sn), and Bi—Pb—Sn—Cd—In—Ti.

11. The heat transfer device of claim 9, wherein the heat transfer fluid loop includes an upper plenum configured to contain an inert cover gas over the liquid heat transfer medium and isolate the liquid heat transfer medium from atmospheric air.

12. A method of operating an energy production device, the method comprising:

heating a heat transmission fluid in a core;

flowing the heat transmission fluid out of the core and through a heat transfer device;

heating a secondary heat transfer medium contained in the heat transfer device with the heat transmission fluid;

converting heat from the secondary heat transfer medium to mechanical motion through an energy harvesting device mounted to a mounting portion of the heat transfer device;

isolating residual motion of the energy harvesting device from a stationary portion of the heat transfer device through a vibration isolator positioned between the mounting portion of the heat transfer device and the stationary portion of the heat transfer device, the vibration isolator including an isolating interface and an insulator positioned between the isolating interface and the secondary heat transfer medium; and generating at least a partial vacuum between the vibration isolator and the heat transfer device by applying a negative pressure to an air gap defined between the vibration isolator and the heat transfer device, the air gap forming the isolating interface.

13. The method of claim 12, wherein isolating the residual motion of the energy harvesting device through the vibration isolator comprises positioning the vibration isolator including a bellows positioned between the insulator and the secondary heat transfer medium.

14. The method of claim 12, further comprises isolating the residual motion of the energy harvesting device through the vibration isolator by absorbing the residual motion with an elastomeric element of the vibration isolator forming the isolating interface at a wall of the stationary portion of the heat transfer device.

* * * * *